(12) United States Patent
Hotson et al.

(10) Patent No.: US 12,217,431 B2
(45) Date of Patent: Feb. 4, 2025

(54) SYSTEMS AND METHODS FOR PANOPTIC SEGMENTATION OF IMAGES FOR AUTONOMOUS DRIVING

(71) Applicant: FORD GLOBAL TECHNOLOGIES, LLC, Dearborn, MI (US)

(72) Inventors: Guy Hotson, Mountain View, CA (US); Nicolas Cebron, Sunnyvale, CA (US); John Ryan Peterson, Pittsburgh, PA (US); Marius Seritan, Daly City, CA (US); Craig Bryan, Canonsburg, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 360 days.

(21) Appl. No.: 17/649,960

(22) Filed: Feb. 4, 2022

(65) Prior Publication Data

US 2023/0252638 A1 Aug. 10, 2023

(51) Int. Cl.
*G06T 7/11* (2017.01)
*G06V 10/22* (2022.01)
(Continued)

(52) U.S. Cl.
CPC .............. *G06T 7/11* (2017.01); *G06V 10/225* (2022.01); *G06V 10/26* (2022.01);
(Continued)

(58) Field of Classification Search
CPC ............. G06T 7/11; G06T 2207/20021; G06T 2207/20081; G06T 2207/20084; G06T 2207/30242; G06T 2207/30252; G06T 2210/12; G06T 2219/004; G06V 10/225; G06V 10/26; G06V 10/7747;
(Continued)

(56) References Cited

U.S. PATENT DOCUMENTS 11,030,364 B2    6/2021 Sholingar et al.
2020/0082219 A1* 3/2020 Li .......................... G06V 20/56
(Continued)

OTHER PUBLICATIONS

Mohan et al., "EfficientPS: Efficient Panoptic Segmentation", Feb. 1, 2021, arXiv:2004.02307v3 [cs.CV], pp. 1-27 (Year: 2021).*
(Continued)

*Primary Examiner* — Chan S Park
*Assistant Examiner* — Daniel C Chang
(74) *Attorney, Agent, or Firm* — Frank A. MacKenzie; Brooks Kushman P.C.

(57) ABSTRACT

Systems and methods for generating a panoptic segmentation mask for an input image. The methods include receiving the input image comprising a plurality of pixels, generating a semantic mask and an instance mask from the input image, and combining the semantic mask and the instance mask to generate a panoptic mask for the input image. The semantic mask includes a single-channel mask that associates each pixel in the input image with a corresponding one of a plurality of labels. The instance mask includes a plurality of masks, where each of the plurality of masks identifies an instance of a countable object in the input image, and is associated with an indication of whether that instance of the countable object is hidden behind another object in the input image.

20 Claims, 12 Drawing Sheets

(51) Int. Cl.
    *G06V 10/26* (2022.01)
    *G06V 10/774* (2022.01)
    *G06V 10/776* (2022.01)
    *G06V 10/82* (2022.01)
    *G06V 20/70* (2022.01)
    *G06V 30/414* (2022.01)

(52) U.S. Cl.
    CPC ........ *G06V 10/7747* (2022.01); *G06V 10/776* (2022.01); *G06V 10/82* (2022.01); *G06V 20/70* (2022.01); *G06V 30/414* (2022.01); *G06T 2207/20021* (2013.01); *G06T 2207/20081* (2013.01); *G06T 2207/20084* (2013.01); *G06T 2207/30242* (2013.01); *G06T 2207/30252* (2013.01); *G06T 2210/12* (2013.01); *G06T 2219/004* (2013.01)

(58) Field of Classification Search
    CPC ...... G06V 10/776; G06V 10/82; G06V 20/70; G06V 30/414; G06V 10/147; G06V 10/25; G06V 10/774; G06V 20/56
    See application file for complete search history.

(56) References Cited

U.S. PATENT DOCUMENTS

| | | |
|---|---|---|
| 2021/0150230 A1 | 5/2021 | Smolyanskiy et al. |
| 2021/0248408 A1* | 8/2021 | Deng .................. G06T 7/13 |
| 2023/0266771 A1* | 8/2023 | Tariq .................. G05D 1/0088 |
| | | 382/298 |

OTHER PUBLICATIONS

Lazarow, J. et al., Learning Instance Occlusion for Panoptic Segmentation, IEEE Xplore, CVPR 2020.
Wang, H. et al., MaX-DeepLab: End-to-End Panoptic Segmentation with Mask Transformers, IEEE Xplore, CVPR 2021.
International Search Report of PCT/US2023/061461 mailed May 21, 2023, 3 pages.
Written Opinion of of PCT/US2023/061461 mailed May 21, 2023, 4 pages.
Valada et al., Efficient Panoptic Segmentation, International Journal of Computer Vision (IJCV), vol. 129, No. 5, pp. 1551-1579, 2021, https://arxiv.org/abs/2004.02307v3.

* cited by examiner

SYSTEMS AND METHODS FOR PANOPTIC SEGMENTATION OF IMAGES FOR AUTONOMOUS DRIVING

BACKGROUND

Statement of the Technical Field

The present disclosure relates generally to image processing systems. More particularly, the present disclosure relates to implementing systems and methods for training and/or using machine learning models and algorithms for panoptic segmentation of images.

DESCRIPTION OF THE RELATED ART

Modern day vehicles have at least one on-board computer and have internet/satellite connectivity. The software running on these on-board computers monitor and/or control operations of the vehicles. The vehicle also comprises cameras, radars, and light detection and ranging (LiDAR) sensors for detecting objects in proximity thereto. A vehicle must perceive and track objects on the road, even if they are behind other objects (e.g. fences).

Panoptic segmentation is a combination of two computer vision tasks: semantic segmentation and instance segmentation. Semantic segmentation accounts for semantic information of the scene and ignores the instance relationship between pixels with the same semantic label. For example, two different cars may receive the same label (e.g., car) in a semantic segmentation map. Instance segmentation is directed to detecting and recognizing countable objects, such as cars, while ignoring other uncountable concepts, such as sky, ground, or the like (i.e., stuff). Panoptic segmentation is the joint task of predicting both semantic and instance segmentation information together per pixel. The desired output includes the semantic label and an instance identifier for countable objects. Panoptic segmentation is, therefore, an approach for labeling every pixel in an image as an instance of a countable object (e.g., a thing), or part of amorphous regions (e.g., stuff).

Current state of the art is to train a neural network to output a panoptic segmentation mask. However, current techniques require every pixel to exclusively belong to a single object without the ability to predict objects behind transparent other objects.

This document describes systems and methods for addressing one or more of the above issues.

SUMMARY

The present disclosure concerns implementing systems and methods for Systems and methods for generating a panoptic segmentation mask for an input image. The methods may include receiving the input image comprising a plurality of pixels, generating a semantic mask and an instance mask from the input image, and combining the semantic mask and the instance mask to generate a panoptic mask for the input image. The semantic mask may include a single-channel mask that associates each pixel in the input image with a corresponding one of a plurality of labels. The instance mask may include a plurality of masks, where each of the plurality of masks identifies an instance of a countable object in the input image, and is associated with an indication of whether that instance of the countable object is hidden behind another object in the input image. Optionally, the panoptic mask may be used to control operations of a mobile platform.

Optionally, each of the plurality of labels can also include a semantic indication of a type of a countable object or amorphous region for each pixel in the input image.

Optionally, the instance mask may include a plurality of bounding boxes, each of the bounding boxes being associated with an instance of one of the countable objects.

In various implementations, the methods may also include generating the instance mask using an instance segmentation neural network, and generating the semantic mask with a semantic segmentation neural network. Optionally, the methods may include training the semantic segmentation neural network and the instance segmentation neural network using a ground truth data set comprising a collection of ground truth examples. Each ground truth example may include an image, a ground truth panoptic mask corresponding to the image, and a plurality of instance labels. Each instance label can include a modal bounding box for one of a plurality of countable objects in the training image, a class label, and pixel id associations with the ground truth panoptic mask. In some such embodiments, a ground truth semantic mask may be generated from the ground truth panoptic mask for training the semantic segmentation neural network.

Additionally and/or alternatively, a ground truth instance mask may be generation from the ground truth panoptic mask and the plurality of instance labels for training the instance segmentation neural network. Such a ground truth instance mask may include a mask for each modal bounding box and an indication of mask validity for that modal bounding box. The indication of mask validity for a modal bounding box provides information relating to whether or not that modal bounding box includes an instance of a countable objects of the training image that is not hidden behind other objects in the training image. Such indication of mask validity may be determined by computing an overlap between an outline encompassing that instance of a countable object and a corresponding modal bounding box. Optionally, the method may also include training the instance segmentation neural network by conditioning loss propagation during training upon the indication of mask validity such that no loss is propagated for predicting a bounding box for an instance of a countable object that is hidden behind other objects in the training image. Additionally, and/or alternatively, the methods may include determining that a mask is not valid when the overlap is less than a threshold.

Implementing systems of the above-described methods for image-based perception and can include, but are not limited to, a processor and a non-transitory computer-readable storage medium comprising programming instructions that are configured to cause the processor to implement a method for training and/or using a machine learning model or algorithm. Optionally, the programming instructions may be included in a computer program product.

BRIEF DESCRIPTION OF THE DRAWINGS

The present solution will be described with reference to the following drawing figures, in which like numerals represent like items throughout the figures.

DETAILED DESCRIPTION

Figure 1:
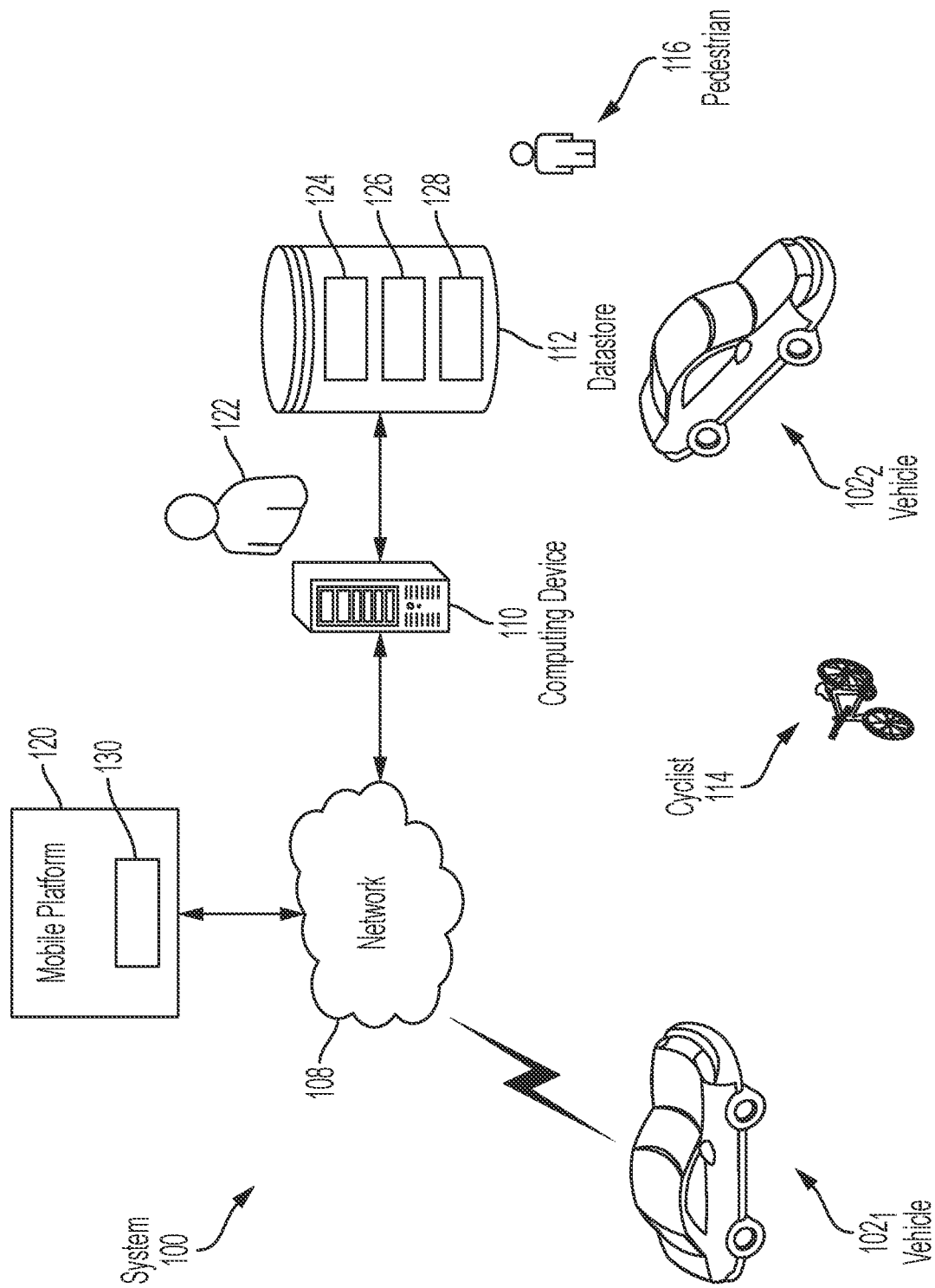
FIG. 1 is an illustration of a system.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

A "machine learning model" or a "model" refers to a set of algorithmic routines and parameters that can predict an output(s) of a real-world process (e.g., prediction of an object trajectory, a diagnosis or treatment of a patient, a suitable recommendation based on a user search query, etc.) based on a set of input features, without being explicitly programmed. A structure of the software routines (e.g., number of subroutines and relation between them) and/or the values of the parameters can be determined in a training process, which can use actual results of the real-world process that is being modeled. Such systems or models are understood to be necessarily rooted in computer technology, and in fact, cannot be implemented or even exist in the absence of computing technology. While machine learning systems utilize various types of statistical analyses, machine learning systems are distinguished from statistical analyses by virtue of the ability to learn without explicit programming and being rooted in computer technology.

The term "bounding box" refers to a rectangular box that represents the location of an object. A bounding box may be represented in data by x- and y-axis coordinates [xmax, ymax] that correspond to a first corner of the box (such as the upper right corner), along with x- and y-axis coordinates [xmin, ymin] that correspond to the corner of the rectangle that is opposite the first corner (such as the lower left corner). Bounding boxes of the current disclosure may be modal and/or amodal. A modal bounding box may be calculated as the smallest rectangle and/or cuboid that contains all the visible points of an object, optionally plus an additional space to allow for a margin of error. An amodal bounding box, on the other hand, may be calculated as an enclosed area that includes visible points as well as interpolated points corresponding to a partially visible object. The points of the object may be those detected by one or more sensors, such as pixels of an image captured by a camera, or points of a point cloud captured by a LiDAR sensor.

As used herein, "transparent" refers to anything that obscures at least part of an object when the object is present behind such transparent material or objects, while still allowing enough free space or visibility for identification of the obscured object. Examples may include, without limitation, clouds, vegetation, smoke, fog, fences, mesh screens, glass, etc.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

Notably, this document describes the present solution in the context of an AV. However, the present solution is not limited to AV applications. The present solution may be used in other applications such as robotic applications, radar system applications, metric applications, and/or system performance applications.

Understanding the scene in which an autonomous robot operates is required for its competent functioning. For example, a vehicle may use scene understanding models, such as a trained machine learning model, to identify objects and/or areas of interest in an image. For example, the machine learning model may be an artificial neural network such as a convolutional neural network trained to identify and track objects captured by one or more sensors, such as light detection and ranging (LIDAR) sensors, radar sensors, cameras, and the like. Object detection applications may analyze sensor image data to detect objects (e.g., pedestrians, cyclists, other cars, etc.) in the environment of the vehicle.

The components or objects of a scene can generally be categorized into amorphous regions (also referred to as "stuff") and "countable objects" (also referred to as "things"), and panoptic segmentation performs pixel classification to classify each pixel of an image into one of as belonging to either amorphous regions or countable objects categories, and also identifies separate instances of countable objects. Pixels classified as "amorphous region" represent amorphous elements of the scene, are typically highly textured, and are not countable. Examples of amorphous regions in the automated driving setting include road, sky, vegetation, clouds, smoke, sidewalk, etc. Pixels classified as "countable objects," on the other hand, belong to specific objects that have characteristic shapes, identifiable parts and can be individually counted as separate instances. For example, vehicles, pedestrians, cyclists, and other countable objects in a scene represent countable object classes. As discussed, panoptic segmentation also provides an instance identifier for each countable object class pixel. Segmentation of amorphous region classes is primarily addressed using the semantic segmentation task which labels all pixels in an image, including the countable objects that are present as well as the surrounding amorphous regions. This latter task, however, does not differentiate between pixels of the same class that belong to different instances of that class. Segmentation of countable object classes into separate instances is addressed by the instance segmentation task. Therefore, analysis of a scene can include semantic segmentation and/or instance segmentation. Semantic segmentation of amorphous regions and countable objects, and instance segmentation of instances of countable objects are well known, for example as described in Mohan et al., "EfficientPS: Efficient Panoptic Segmentation," published in *International Journal of Computer Vision* 129, 1551-1579 (2021).

Semantic segmentation may be used to identify an area of road to assist the vehicle in localizing itself within the area, such that the vehicle may move within the area. As discussed above, in semantic segmentation, each pixel of an input image is associated with a label (e.g., semantic label) to generate a semantic segmentation mask (or map). For example, in an image of a road, pixels may be associated with labels, such as car, road, vegetation, sign, or other objects found in a road image. For semantic segmentation, the instance relationships between pixels with the same label are ignored. For example, two different cars may receive the same label (e.g., car) in a semantic segmentation output, and not distinguished from each other. Instance segmentation, on the other hand, identifies individual instances of objects within a scene, regardless of whether the objects are of the same type. In instance segmentation, a machine learning model may identify countable objects, such as a number of cars, while ignoring amorphous regions such as sky, ground, road, etc. That is, in an image of a road, instance segmentation may identify each instance of cars, pedestrians, bikes, and road signs, while ignoring the road, sky, and ground. In an instance segmentation mask (or map), each object may be identified by a bounding box or other type of identifier.

As discussed above, in semantic segmentation, individual instances of a same object are indistinguishable. In contrast, instance segmentation identifies individual instances of the same countable object and does not identify uncountable objects (e.g., amorphous regions). To improve the operation of vehicles, panoptic segmentation networks combine information from a semantic segmentation map and information from an instance segmentation map to generate a panoptic segmentation map. In conventional panoptic segmentation networks, various approaches are used to obtain and combine (e.g., fuse) information from the instance segmentation map with information from the semantic segmentation map. Instance segmentation masks can be further distinguished as modal (showing a view of the object within a scene, respecting occlusions) or amodal (showing the entire object unobstructed).

Panoptic segmentation may be performed in a bottom-up approach, where semantic segmentation is followed by clustering of countable objects pixels into instances. The advantage of such methods is high inference speed, but early results lack in accuracy. Moreover, such approaches output non-overlapping predictions, and it is not possible to predict a countable object behind another object (either a countable object or an amorphous region). A top-down panoptic segmentation approach, on the other hand, includes multi-task joint networks that perform semantic segmentation and instance segmentation with two separate decoders on top of a shared encoder. For example, a shared encoder may obtain features from an input and one decoder head predicts the semantic segmentation map and another decoder head predicts the instance segmentation map. The semantic segmentation map and the instance segmentation map may be fused to generate the panoptic segmentation mask either using manual heuristic and/or automatically using, for example, a neural network. That is, fusion is performed at inference time using an algorithm that potentially leverages learned weights, which reduces the processing speed and increases the use of system resources, such as memory, processor load, power, etc.

Aspects of the present disclosure enable the prediction of countable objects overlapping with other objects (either a countable object or an amorphous region) and reduces the use of system resources and processing speed by skipping the fusion stage. When training machine learning models for performing the top-down panoptic segmentation, instance mask targets are typically derived from the ground truth panoptic masks, and every bounding box for every image has a corresponding instance mask loss. The training methods of this disclosure makes this instance mask loss optional by ignoring the instance mask loss when the ground truth bounding box does not overlap enough with the corresponding box within the panoptic mask. The panoptic segmentation methods of the current disclosure also, optionally, output an indicator for whether the instance of a countable object is behind another countable object or amorphous region.

The machine learning models and/or algorithms can include, but are not limited to, Convolutional Neural Networks (CNNs) and/or Recurrent Neural Networks (RNNs). Images may be input into trained CNN(s) and RNNs to produce the panoptic masks and an indicator of whether the instance of a countable object is behind another countable object or amorphous region. The panoptic mask of the image is determined based on learned data patterns during training of the CNN/RNN. The present solution provides a novel training process for machine learning models/algorithms with a reduced computation time and less resource utilization. The primary novelty involves training of independent semantic and instance head outputs, with a loss for the instance head conditioned on the overlap between a box encompassing instance identifications in the panoptic mask and a corresponding bounding box (modal or amodal) label. The training data set can be created using image(s) or other sensor data generated by one or more sensor(s) (e.g., cameras and/or LiDAR systems) on a mobile platform (e.g., an autonomous vehicle). The labels or ground truth values may be manually defined for each data point.

Such a training process has a reduced training time without compromising inference performance and many novel features. The novel features include, but are not limited to, panoptic segmentation of images with reduced usage of computation resources and providing an indication of whether a detected instance is behind another object (countable objects and/or amorphous regions).

The present solution will be described below in the context of an autonomous vehicle application. The present solution is not limited to autonomous vehicle applications. The present solution can be used in other applications such as other robotic applications (e.g., to control an articulating arm), or the like.

Illustrative Implementing Systems

Referring now to FIG. 1, there is provided an illustration of an illustrative system 100 implementing the present solution. System 100 comprises a mobile platform 120 communicatively coupled to a computing device 110 via a network 108 (e.g., the Internet and/or cellular network). The mobile platform 120 is configured to generate sensor data 124. The mobile platform can include, but is not limited to, a land vehicle (as shown in FIG. 1), an aircraft, a watercraft, a subterrene, or a spacecraft. The sensor data 124 can include, but is not limited to, images and/or LiDAR datasets. The sensor data 124 is communicated from the mobile platform 120 to the computing device 110 for processing and/or storage in datastore 112.

A user 122 of the computing device 110 can perform user-software interactions to access the sensor data 124 and use the sensor data to generate training data sets 126 for machine learning model(s) or algorithm(s) 128. Each training data set 126 comprises a plurality of training examples $(x_0, y_0), (x_1, y_1), \ldots, (x_n, y_n)$. For example, a machine learning model $f_\theta(x)$ is trained with a training data set comprising a collection of training examples $(x_0, y_0), (x_1, y_1), \ldots, (x_n, y_n)$, where each component $x_0, x_1, \ldots, x_n$ represents a sensor output (e.g., an image) comprising a collection of data points $d_1, d_2, \ldots, d_r$ (e.g., pixel values for the image) and each component $y_0, y_1, \ldots, y_n$ represents a label or ground truth. n and r are integers. The terms "label" and "ground truth" as used here both refer to a true value for a property to be predicted (e.g., a type of object (such as a cyclist), a 3D size of an object (e.g., a predicted cuboid box), a semantic label, or a position of the object in an image) by the machine learning models/algorithms. The user 122 can manually define the labels or ground truth values $y_i$ for each data set $x_i$. Optionally, the labels or ground truth values may be automatically generated using now or hereafter known methods. The training data set 126 is then stored in datastore 112 (e.g., a database) and/or used by the computing device 110 during a training process to train the machine learning model(s)/algorithm(s) 128 to, for example, facilitate panoptic mask generation and for identification of a countable objects behind amorphous region in a scene by another mobile platform using loss functions that iteratively process training examples over multiple cycles. The training process will be described in detail below.

Once trained, the machine learning model(s)/algorithm(s) 128 is(are) deployed on the other mobile platforms such as vehicle $102_1$. Vehicle $102_1$ can travel along a road in a semi-autonomous or autonomous manner. Vehicle $102_1$ is also referred to herein as an Autonomous Vehicle (AV). The AV $102_1$ can include, but is not limited to, a land vehicle (as shown in FIG. 1), an aircraft, a watercraft, a subterrene, or a spacecraft. AV $102_1$ is generally configured to use the trained machine learning model(s)/algorithm(s) 128 to detect objects $102_2$, 114, 116 and perceive scenes in proximity thereto. The objects can include, but are not limited to, a vehicle $102_2$, a cyclist 114 (such as a rider of a bicycle, electric scooter, motorcycle, or the like) and/or a pedestrian 116 as well as amorphous regions (not shown here).

When scene perception is made (e.g., using a panoptic mask), AV $102_1$ performs operations to: generate one or more possible object trajectories for some of the detected objects; and analyze at least one of the generated possible object trajectories to determine whether or not there is at least a threshold possibility or likelihood that a collision will occur between the AV and object if the AV is to follow a given trajectory. If not, the AV $102_1$ is caused to follow the given vehicle trajectory. If so, the AV $102_1$ is caused to (i) follow another vehicle trajectory with a relatively low probability of collision with the object or (ii) perform a maneuver to reduce the probability of collision with the object or avoid collision with the object (e.g., brakes and/or changes direction of travel).

Figure 2:
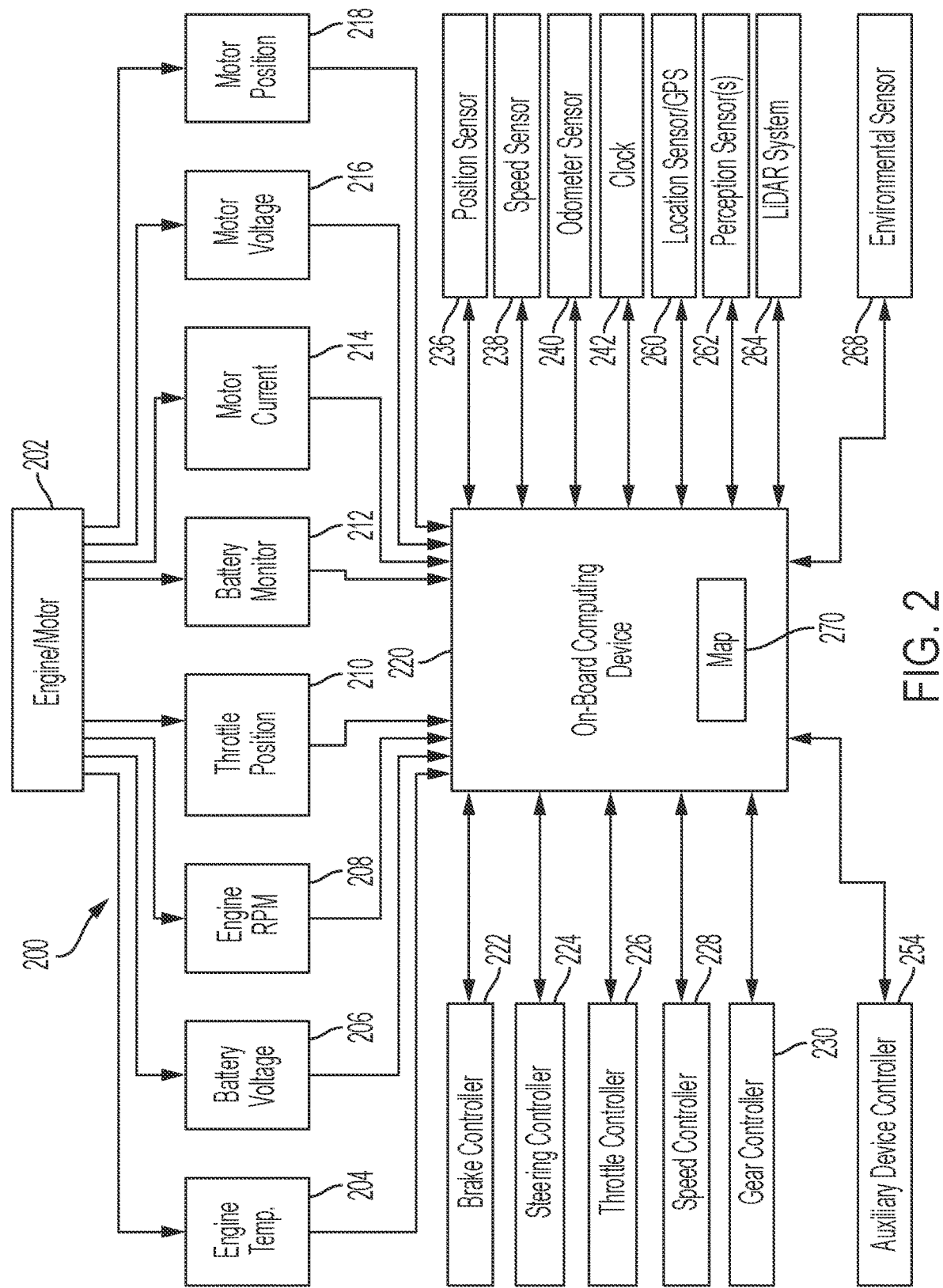
FIG. 2 is an illustration of an architecture for a vehicle.

Referring now to FIG. 2, there is provided an illustration of an illustrative system architecture for a mobile platform 200. Mobile platforms $102_1$, $102_2$ and/or 120 of FIG. 1 can have the same or similar system architecture as that shown in FIG. 2. Thus, the following discussion of mobile platform 200 is sufficient for understanding mobile platform (s) $102_1$, $102_2$, 120 of FIG. 1.

As shown in FIG. 2, the mobile platform 200 includes an engine or motor 202 and various sensors 204-218 for measuring various parameters of the mobile platform. In gas-powered or hybrid mobile platforms having a fuel-powered engine, the sensors may include, for example, an engine temperature sensor 204, a battery voltage sensor 206, an engine Rotations Per Minute (RPM) sensor 208, and a throttle position sensor 210. If the mobile platform is an electric or hybrid mobile platform, then the mobile platform may have an electric motor, and accordingly will have sensors such as a battery monitoring system 212 (to measure current, voltage and/or temperature of the battery), motor current 214 and motor voltage 216 sensors, and motor position sensors such as resolvers and encoders 218.

Operational parameter sensors that are common to both types of mobile platforms include, for example: a position sensor 236 such as an accelerometer, gyroscope and/or inertial measurement unit; a speed sensor 238; and an odometer sensor 240. The mobile platform also may have a clock 242 that the system uses to determine mobile platform time during operation. The clock 242 may be encoded into an on-board computing device, it may be a separate device, or multiple clocks may be available.

The mobile platform also will include various sensors that operate to gather information about the environment in which the mobile platform is traveling. These sensors may include, for example: a location sensor 260 (e.g., a Global Positioning System (GPS) device); and perception sensors 262 such as one or more image based sensors (e.g., cameras), radio detection and ranging sensor (radar), sonar sensor, light detection and ranging sensor (LiDAR system 264), or the like. The sensors also may include environmental sensors 268 such as a precipitation sensor and/or ambient temperature sensor. The perception sensors may enable the mobile platform to detect objects that are within a given distance range of the mobile platform 200 in any direction, while the environmental sensors collect data about environmental conditions within the mobile platform's area of travel.

During operations, information is communicated from the sensors to the on-board computing device 220. The on-board computing device 220 can (i) cause the sensor information to be communicated from the mobile platform to an external device (e.g., computing device 110 of FIG. 1) and/or (ii) use the sensor information to control operations of the mobile platform. For example, the on-board computing device 220 may control: braking via a brake controller 232; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers.

Geographic location information may be communicated from the location sensor 260 to the on-board computing device 220, which may then access a map of the environment that corresponds to the location information to determine known fixed features of the environment such as streets, buildings, stop signs and/or stop/go signals.

In some scenarios, the on-board computing device 220 detect a moving object and perform operations when such detection is made. For example, the on-board computing device 220 may generate one or more possible object trajectories for the detected object, and analyze the possible object trajectories to assess the risk of a collision between the object and the AV if the AV was to follow a given platform trajectory. If the risk does not exceed the acceptable threshold, then the on-board computing device 220 may cause the mobile platform 200 to follow the given platform trajectory. If the risk exceeds an acceptable threshold, the on-board computing device 220 performs operations to: (i) determine an alternative platform trajectory and analyze whether the collision can be avoided if the mobile platform follows this alternative platform trajectory; or (ii) causes the mobile platform to perform a maneuver (e.g., brake, accelerate, or swerve).

Figure 3:
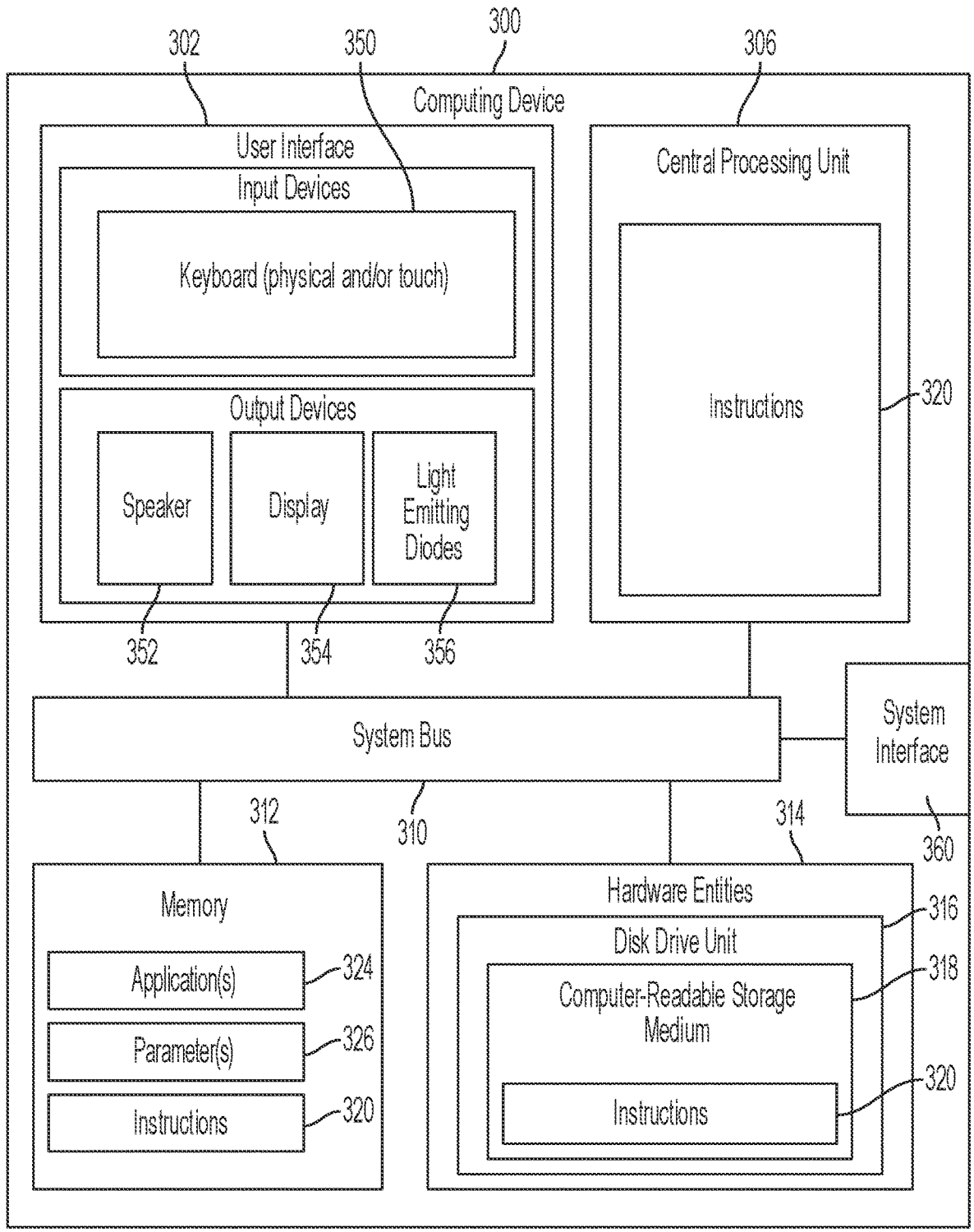
FIG. 3 is an illustration of an architecture for a computing device.

Referring now to FIG. 3, there is provided an illustration of an illustrative architecture for a computing device 300. The computing device 110 of FIG. 1 and/or the on-board computing device 220 of FIG. 2 is/are the same as or similar to computing device 300. As such, the discussion of computing device 300 is sufficient for understanding the computing device 110 of FIG. 1 and the on-board computing device 220 of FIG. 2.

Computing device 300 may include more or less components than those shown in FIG. 3. However, the components shown are sufficient to disclose an illustrative solution implementing the present solution. The hardware architecture of FIG. 3 represents one implementation of a representative computing device configured to operate a vehicle, as described herein. As such, the computing device 300 of FIG. 3 implements at least a portion of the method(s) described herein.

Some or all components of the computing device 300 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 3, the computing device 300 comprises a user interface 302, a processor (e.g., a central processing unit (CPU)) 306, a system bus 310, a memory 312 connected to and accessible by other portions of computing device 300 through system bus 310, a system interface 360, and hardware entities 314 connected to system bus 310. The user interface can include input devices and output devices, which facilitate user-software interactions for controlling operations of the computing device 300. The input devices include, but are not limited to, a physical and/or touch keyboard 350. The input devices can be connected to the computing device 300 via a wired or wireless connection (e.g., a Bluetooth® connection). The output devices include, but are not limited to, a speaker 352, a display 354, and/or light emitting diodes 356. System interface 360 is configured to facilitate wired or wireless communications to and from external devices (e.g., network nodes such as access points, etc.).

At least some of the hardware entities 314 perform actions involving access to and use of memory 312, which can be a Random Access Memory (RAM), a disk drive, flash memory, a Compact Disc Read Only Memory (CD-ROM) and/or another hardware device that is capable of storing instructions and data. Hardware entities 314 can include a disk drive unit 316 comprising a computer-readable storage medium 318 on which is stored one or more sets of instructions 320 (e.g., software code) configured to implement one or more of the methodologies, procedures, or functions described herein. The instructions 320 can also reside, completely or at least partially, within the memory 312 and/or within the processor 306 during execution thereof by the computing device 300. The memory 312 and the processor 306 also can constitute machine-readable media. The term "machine-readable media", as used here, refers to a single medium or multiple media (e.g., a centralized or distributed database, and/or associated caches and servers) that store the one or more sets of instructions 320. The term "machine-readable media", as used here, also refers to any medium that is capable of storing, encoding or carrying a set of instructions 320 for execution by the computing device 300 and that cause the computing device 300 to perform any one or more of the methodologies of the present disclosure.

FIG. 4 illustrates an example of a panoptic segmentation network according to aspects of the present disclosure. As shown in FIG. 4A, an image 400 is obtained from one or more sensors, such as a camera or a LiDAR. The image 400 may be processed by models of a multi-mask generation segment 410 of the panoptic segmentation network. The multi-mask generation segment 410 may include a semantic segmentation model 410(a), a bounding box model 410(b), and an instance segmentation model 410(c). Each model may be a distinct artificial neural network. The multi-mask generation segment 410 may also include a feature extractor 410(d). The feature extractor 410(d) extracts, from the image 400, information (e.g., features) for generation of the semantic mask, the bounding boxes, the instance mask, and/or the panoptic mask. It will be understood that while FIG. 4A illustrates a single feature extractor 410(d) that provides inputs to all the models of the multi-mask generation segment 410 of the panoptic segmentation network, the disclosure is not so limiting, and a separate feature extractor may be used for one or more of the models.

As discussed, the semantic segmentation model 410(a) may be used to generate the semantic mask 422. The semantic segmentation model 410(a) provides an independent single-channel mask corresponding to the type of countable object(s) or amorphous region(s) for each pixel in the input image 400. For example, if a crowd of pedestrians is present, then each pixel for the entire crowd will be labeled as "pedestrian" without any differentiation between the pedestrians. Similarly, if a sky is present, each pixel of the sky will be labeled as a class of amorphous region (i.e., sky). As shown in FIG. 4B, the semantic mask 422 includes a unique mask (422(a), 422(b), 422(c), 422(d), and 422(e)) corresponding to: the road, the sky, the buildings, the sidewalk, and the fence, respectively, without distinction between different amorphous regions or countable objects of the same type. The architecture of the semantic segmentation model may be described as an encoder network followed by a decoder network. The decoder semantically projects discriminative features learned by the encoder onto the pixel space to obtain a dense classification. In contrast to conventional classifications, where the end result (e.g., the classification) of the artificial neural network is the main objective, semantic segmentation uses an encoder network for pixel-level discrimination as well as a decoding network for projecting the learned discriminative features onto the pixel space. Different approaches employ different decoding networks. Aspects of the present disclosure are not limited to a particular encoder/decoder network architecture for the semantic segmentation model The bounding box model 410(b) may be used to generate an output 424 including a cuboid (or any other shape) bonding boxes 424a-n around detected countable objects (e.g., the vehicles, lamp posts, etc.). The instance segmentation model 410(c) may be used to generate the instance mask 426 from the output of the encoder, optionally conditioned on the output 424 of the bounding box model. As shown in FIG. 4C, the instance mask 426 includes a separate mask (e.g., 426(a), 426(b), and 426(c)) for each countable object. Specifically, the instance segmentation model 410(c) is a "top-down" approach which first detects all instances (optionally conditioned on the bounding box model output), then predicts independent masks for each of the instances detected. In this manner, it is possible to output overlapping masks corresponding to transparent objects (e.g., clouds, smoke, fences, mesh screens, glass, etc.). Optionally, the instance segmentation model may output an additional "behind something" attribute or label for an instance to denote that it is determined to be behind another object (e.g., countable object or amorphous region). For example, for the instance mask 426, the masks 426(a) and 426(b) will include a label that they are behind another countable object or amorphous region (e.g., the fence in the image) while the mask 426(c) will not include any such indication or label. The architecture of an instance segmentation model and/or a bounding box model may also be generally described as an encoder network followed by a decoder network. Aspects of the present disclosure are not limited to a particular encoder/decoder network architecture for the instance segmentation model. The architecture of an instance segmentation model may also be generally described as an encoder network followed by a decoder network. Aspects of the present disclosure are not limited to a particular encoder/decoder network architecture for the instance segmentation model.

Figure 4A:
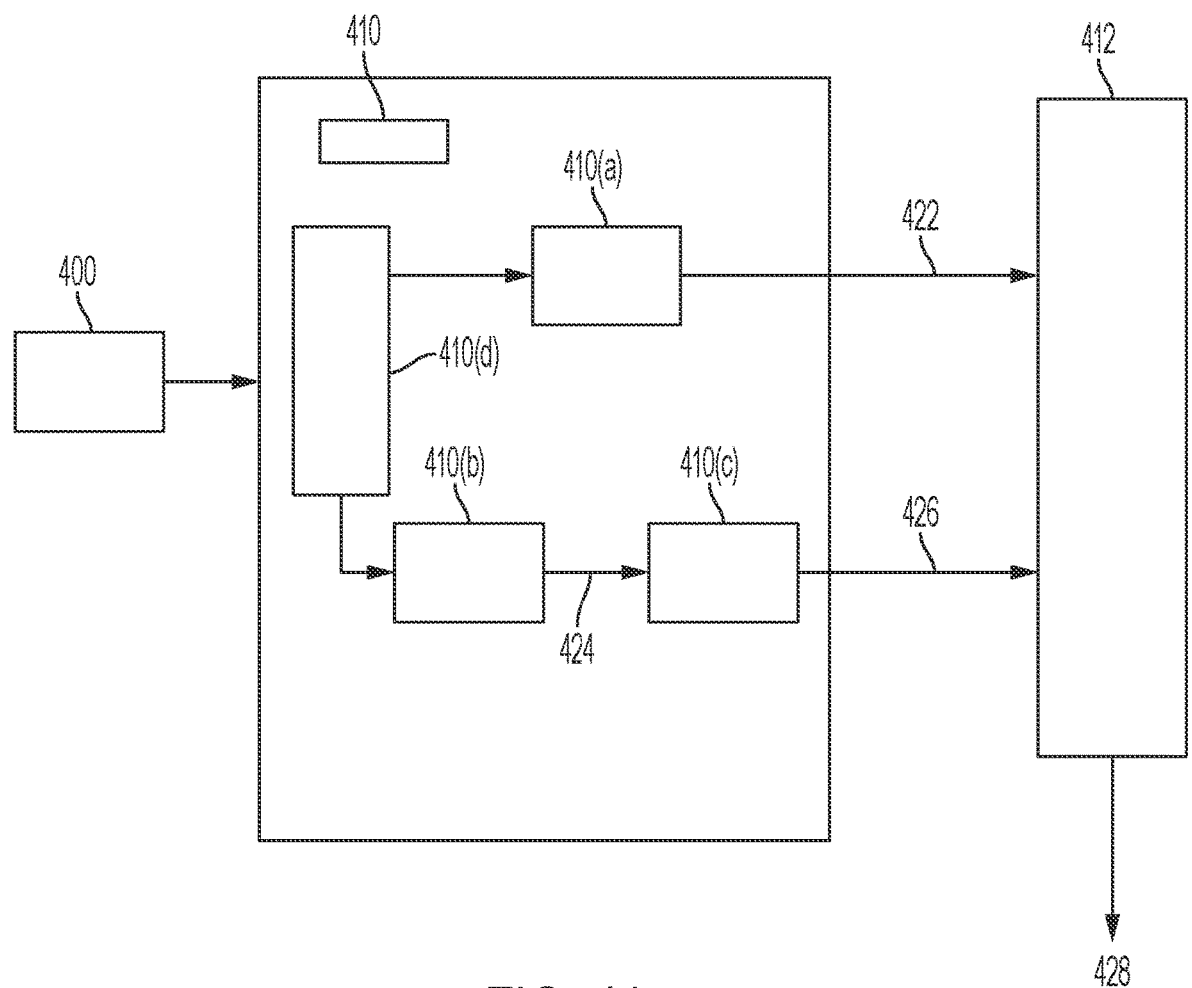
FIG. 4A is an example of a panoptic segmentation network.
Figure 4B:
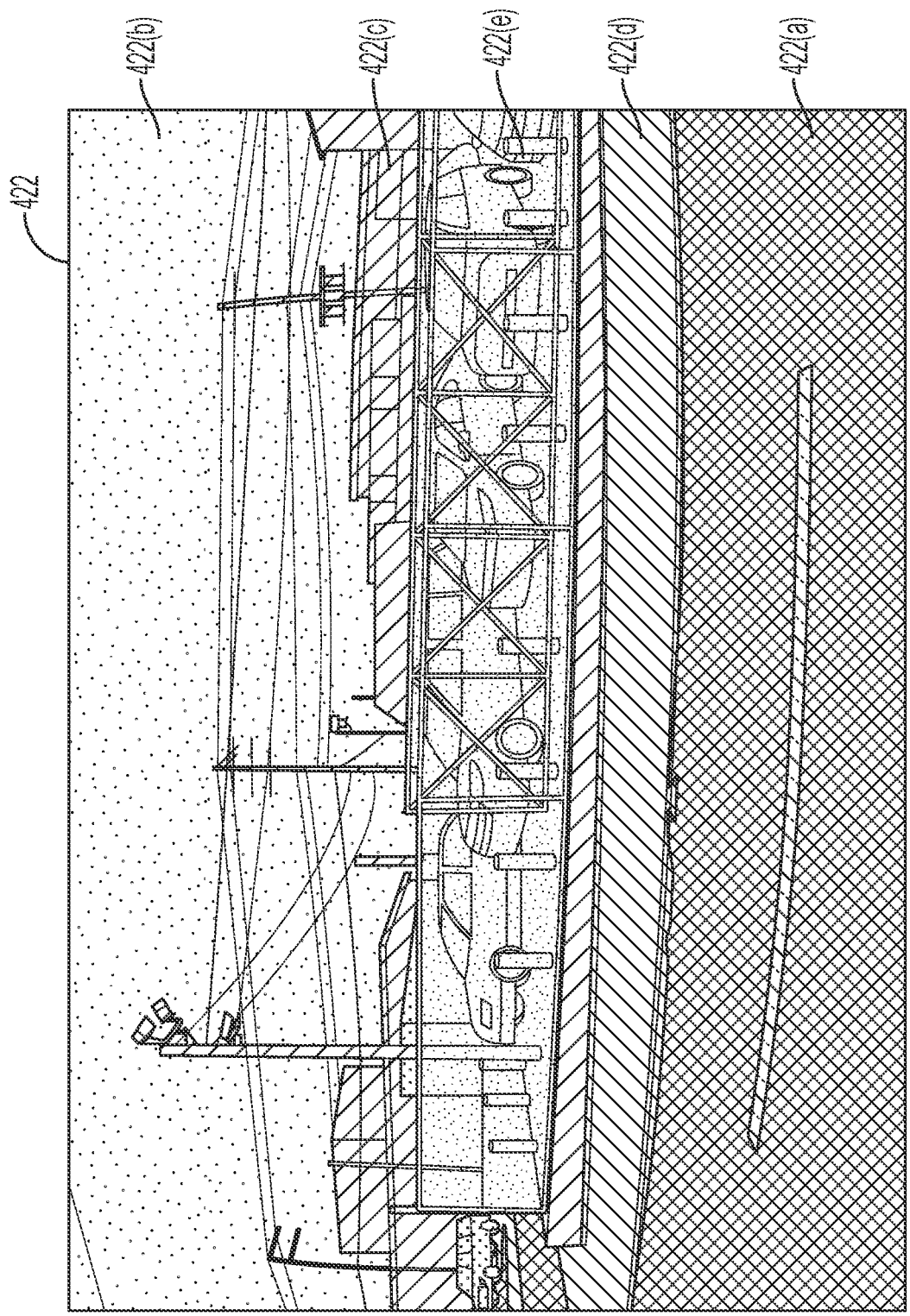
FIGS. 4B-4E illustrate example image segmentation outputs from various components of the panoptic segmentation network.
Figure 4C:
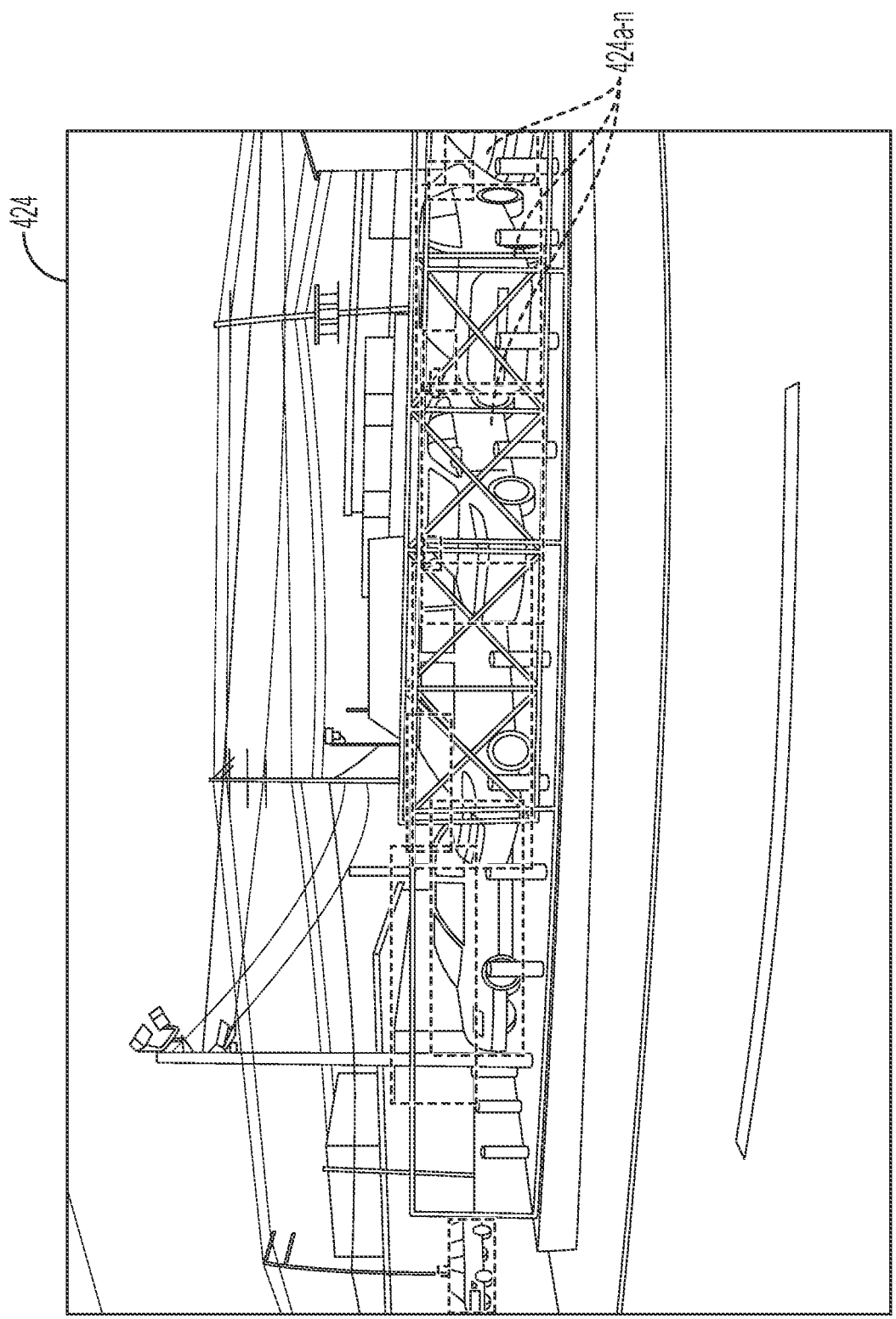
Figure 4D:
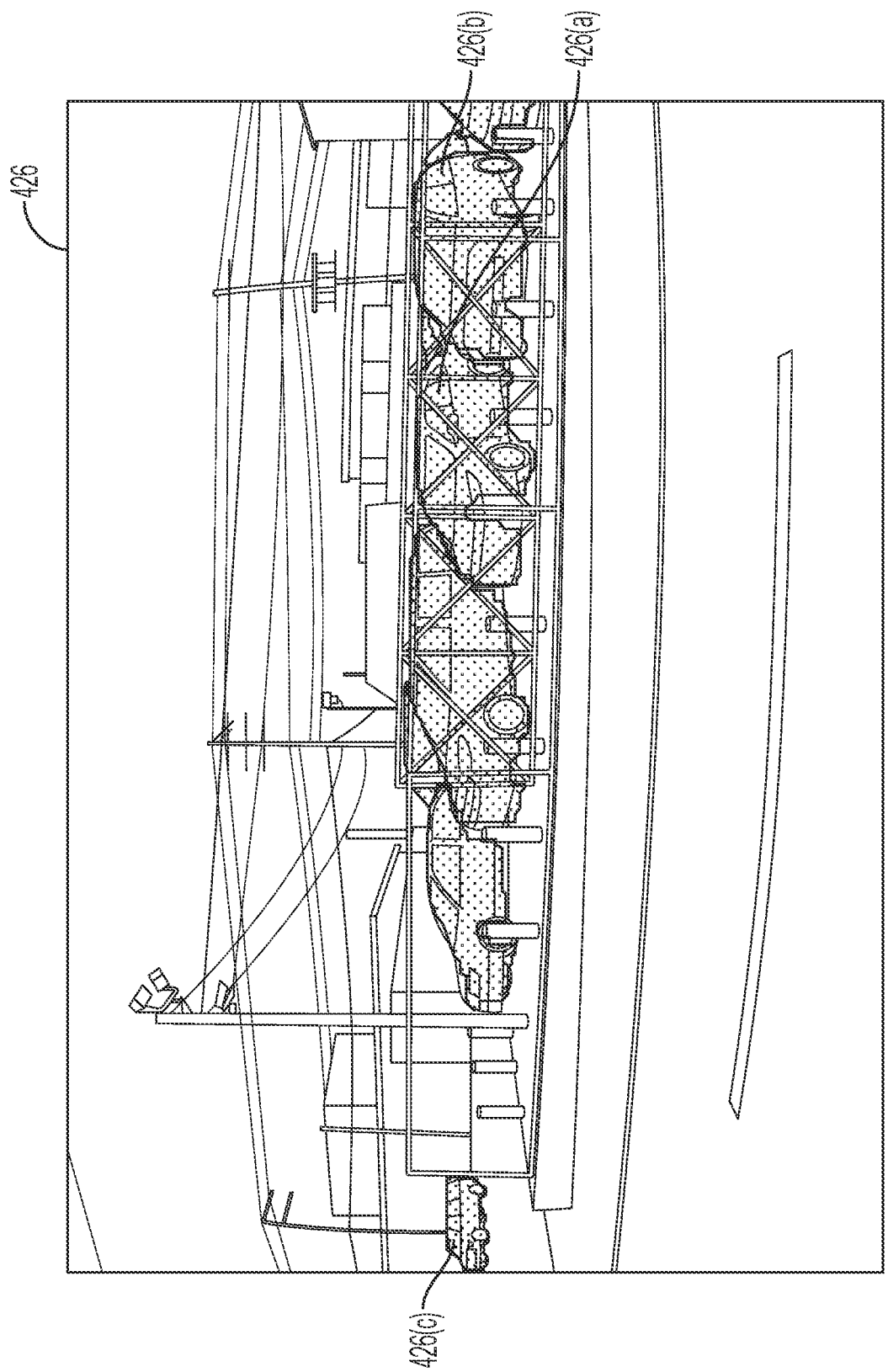
Figure 4E:
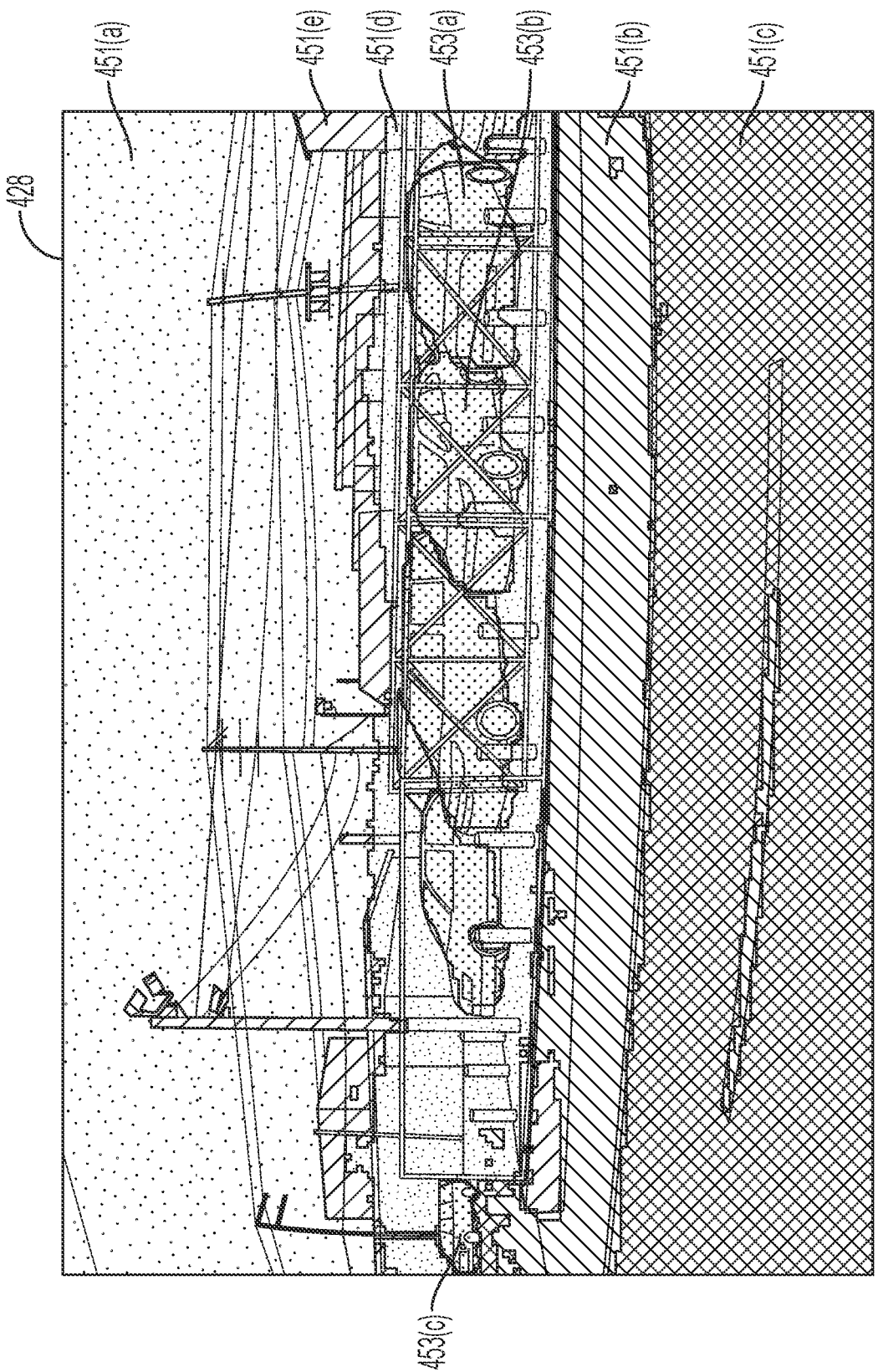

As shown in FIG. 4A, after generating the semantic mask 422 and the instance mask 426, a panoptic mask generator 412 may combine (e.g., by overlaying) the semantic mask 422 over the instance mask 426 to generate a panoptic mask 428. Such combination does not include fusion of the instance mask and the semantic mask in order to reduce computational resource utilization as well as to enable prediction of countable objects overlapping with other countable objects or amorphous region in the image. Optionally, the instance and semantic masks can then be consumed independently (without combination) by downstream processes, enabling situations such as a car behind a fence to be identified and handled appropriately. As shown in FIG. 4E, the generated panoptic mask includes an output of the semantic segmentation model shown as different hatched patterns (451(a)—sky, 451(b)—sidewalk, and 451(c)—road, 451(d)—fence, and 451(e)—static amorphous regions like buildings), and an output of the panoptic mask 453(a), 453(b), and 453(c) as outlines of the specific detected vehicles when multiple vehicles are detected. Optionally, bounding boxes as cuboids (or other box shapes) corresponding to the detected vehicles may be also output (not shown here) in the panoptic mask. Additionally, for instances of countable objects detected behind other objects, the panoptic mask also includes or is associated with label regarding the same. For example, the vehicle outlines 453(a) and 453(b) will be associated with an indicator or label that they are behind another object (e.g., the fence in the image) while the mask the vehicle outline 453(c) will be associated with a label that it is not behind anything will not be associated with such an indicator or label (or vice versa).

It should be noted that one or more of the 422 (semantic mask), 424 (bounding boxes), 426 (instance mask), and 428 (panoptic mask with indications of whether countable objects are behind other transparent objects) may be generated as outputs from the panoptic segmentation network of this disclosure.

Conventionally, for training top-down models for panoptic mask generation, the instance mask targets are typically derived from panoptic masks in training data, and every bounding box for every image has a corresponding instance mask loss. In contrast, the proposed training methods make this instance mask loss optional by ignoring the loss when the ground truth box (modal or amodal) does not overlap substantially enough with the encompassing box within the panoptic mask (discussed below in more detail).

Figure 5:
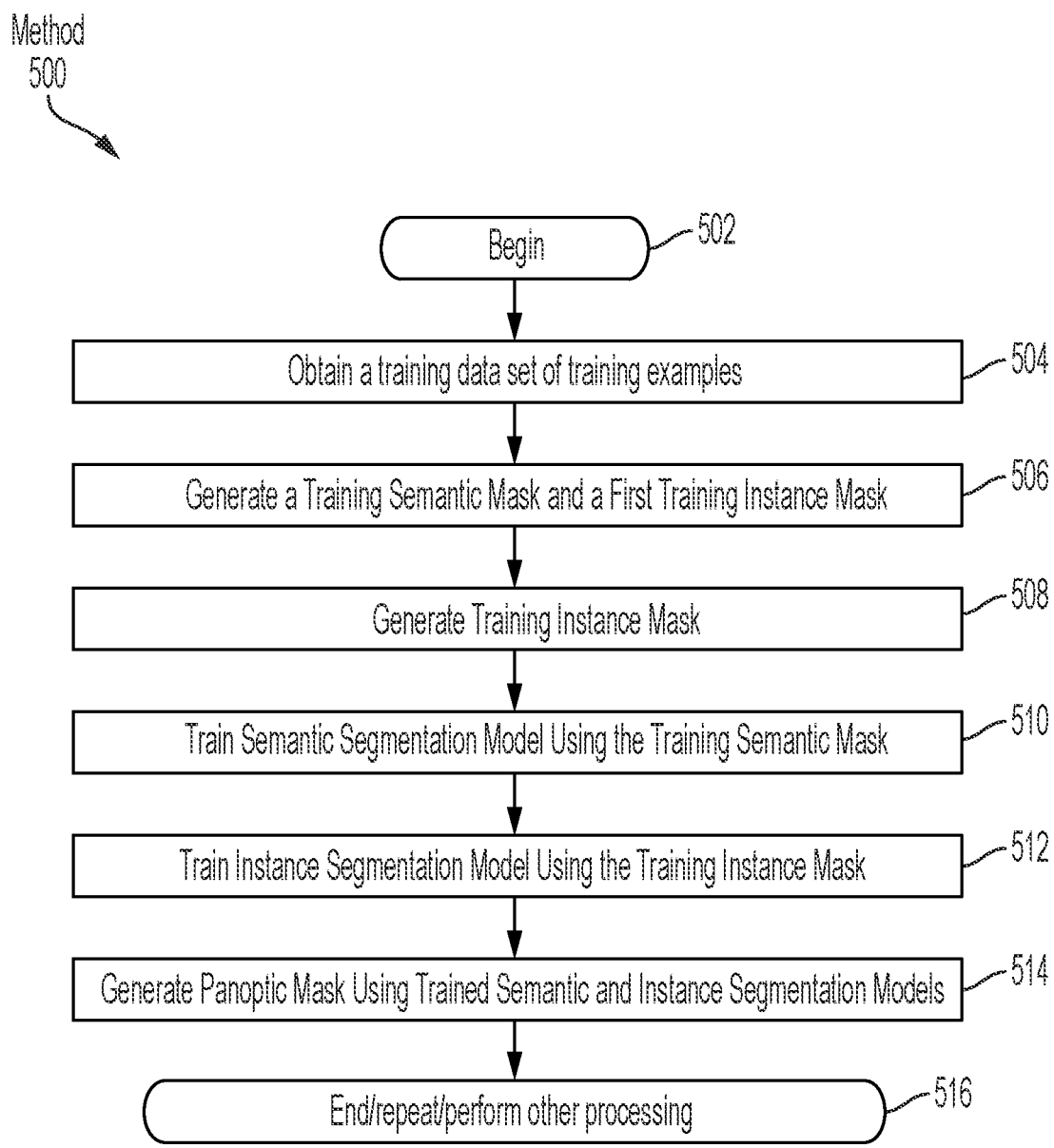
FIG. 5 provides a flow diagram of an illustrative method for improved machine learning optimization.

Referring now to FIG. 5, there is provided a flow diagram of an illustrative method 500 for training a machine learning model or algorithm (e.g., machine learning model/algorithm 128 of FIG. 1) for generating a panoptic mask for an image and/or indicators for whether or not an instance of a countable object is behind another countable object or amorphous region. Method 500 can be implemented in mobile platform 120 of FIG. 1, computing device 110 of FIG. 1 and/or computing device 300 of FIG. 3.

Method 500 begins with 502 and continues with 504 where a computing device obtains a ground truth data set (e.g., ground truth data set 126 of FIG. 1) from a datastore (e.g., datastore 112 of FIG. 1 and/or memory 312 of FIG. 3). When building a machine learning dataset, the ground-truth dataset may be divided into two smaller datasets: the training dataset and the testing dataset where the machine learning algorithm may be trained on the training dataset, and is tested using the testing dataset.

The ground truth data set comprises a plurality of training examples $(x_0, y_0), (x_1, y_1), \ldots, (x_n, y_n)$. As noted above, the ground truth data set may be created using image(s) and/or other sensor data generated by one or more sensor(s) (e.g., sensors 130 of FIG. 1) on a mobile platform (e.g., mobile platform 120 of FIG. 1). The labels or ground truth values $y_i$ may have been manually defined labels by a user (e.g., user 122 of FIG. 1) of the computing device for each data set $x_i$. Each of the ground truth data sets of the current disclosure includes an image (e.g., an RGB image) and labels corresponding to the image (including a ground truth panoptic mask and instance boxes). The ground truth panoptic mask or labels are a single channel mask for every pixel in the image with the identifications (ids) for all the countable objects and amorphous regions, as well as a lookup table for the class for each pixel id. Instance labels are composed of bounding boxes (modal or amodal), class labels, and corresponding pixel ids in the ground truth panoptic mask.

Figure 8:
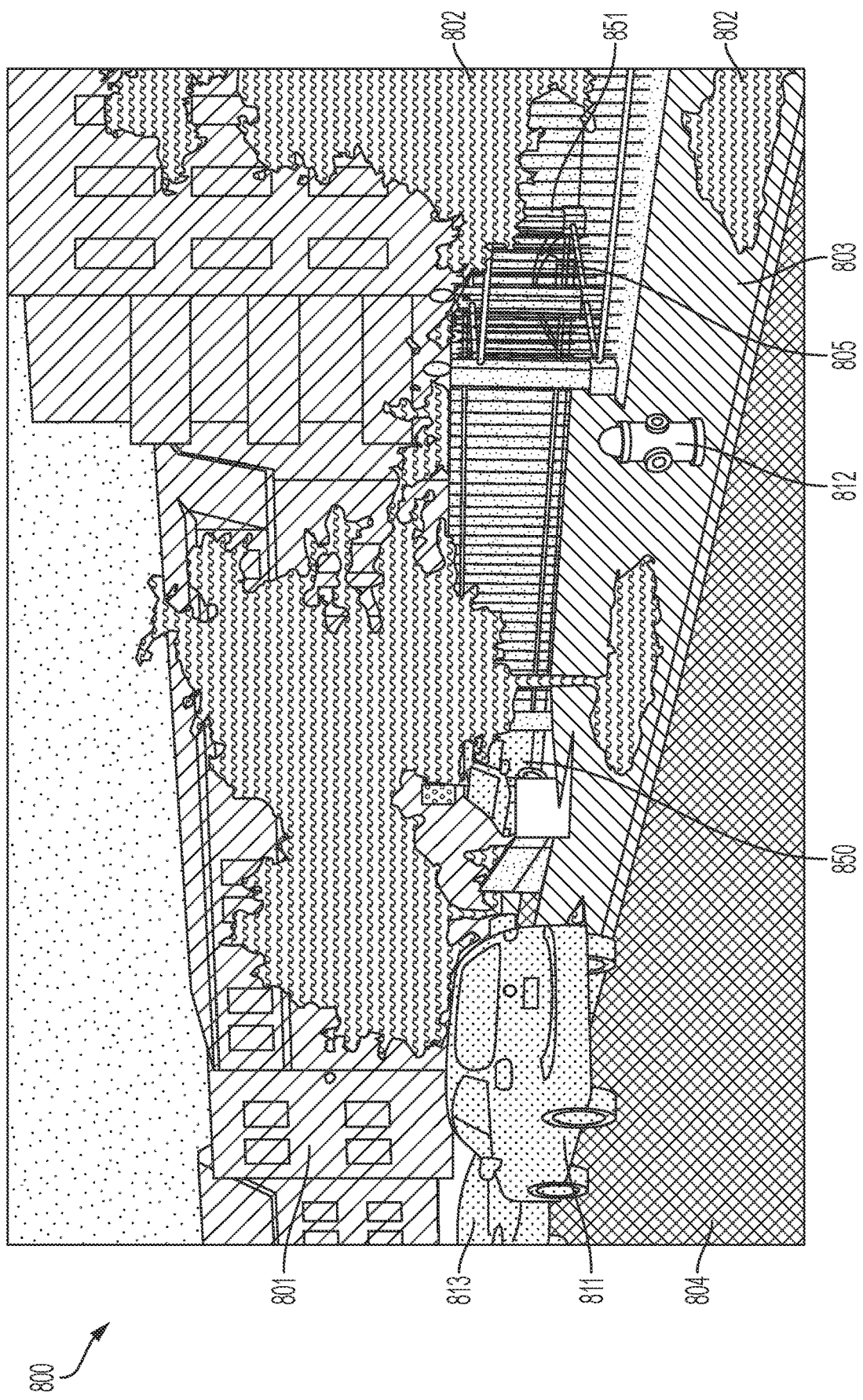
FIG. 8 provides an example of a panoptic mask generated for an image using the methods of this disclosure.

FIG. 8 illustrates an example ground truth panoptic mask 800 for an image including semantic masks 801, 802, 803, 804, and 805 corresponding to the buildings, vegetation, sidewalk, road, and transparent amorphous region (i.e., fence), respectively. The ground truth panoptic mask 800 also includes instance masks corresponding to the individual countable objects such as 811, 812, 813, and 814. Countable objects behind transparent amorphous region or countable objects either do not have an instance mask (e.g., vehicle 850 behind fence on the right) or a partial mask (e.g., vehicle 851 behind fence in the center). A lookup table of what class each pixel id in the panoptic mask corresponds to is also provided with the ground truth data.

Next in 506, for each ground truth data example, a ground truth semantic mask and an initial ground truth instance mask for the image is generated from the corresponding ground truth panoptic mask. The ground truth semantic mask is generated by using the lookup table of the class for each pixel id in the ground truth panoptic mask. The initial ground truth instance mask is generated by filtering for instance id's for the countable object classes in the ground truth panoptic mask. As discussed above, in a ground truth semantic mask, each pixel of the image is associated with a label (e.g., semantic label such as vehicle(s), road, vegetation, sky sign, etc.) while instance relationships between pixels with the same label are ignored. The initial ground truth instance mask includes an identifier mask around each identifiable countable object.

The computing device then uses the ground truth semantic mask to train the semantic segmentation model (e.g., semantic segmentation model 410(a) of FIG. 4) at 510. Techniques for training machine learning models/algorithms using training data (derived from a ground truth data set) are known. For example, the training methods may include determining a derivative vector θ of a loss function $l_θ(x)$ for each training example including the image and the semantic mask. Techniques for determining derivative vectors for loss functions are well known. In some scenarios, the loss function $l_θ(x)$ involves comparing a true value $y_i$ with a predicted value $y_p$ to obtain an output representing a distance (e.g., a Euclidean distance) between the true value $y_i$ and the predicted value $y_p$. The distance output by the loss function $l_θ(x)$ should be small. The derivative vector θ may be changed in accordance with a known backpropagation algorithm in the direction of the derivative for the loss function (i.e., the direction of the steepest descent of the loss function). The backpropagation algorithm generally computes the gradient of the loss function with respect to the weights of the neural network for a set of input-output training examples, often called a training batch.

At 508, information included in the initial ground truth instance mask is combined with the bounding box instance labels in the training example to generate a second ground truth instance mask. The second ground truth instance mask may include an instance mask per modal bounding box (in the instance labels) of the image as well as an indication of mask validity per bounding box. As discussed above with respect to FIG. 4, the instance mask per modal bounding box may include an outline of an object contained within a bounding box. The indication of mask validity per bounding box may provide information relating to whether or not the bounding box actually includes an instance of a countable object that is not hidden behind other amorphous region or countable object. Specifically, for each instance in a panoptic mask, an overlap is computed between the outline encompassing instance ids in panoptic mask and the corresponding modal bounding box. For example, the intersection over union (IoU) of the 2D bounding box coordinates with the 2D coordinates outlining the instance mask may be used. If the overlap is more than a threshold than the instance mask is determined to be valid for that bounding box (i.e., the object is at least partially visible). However, if the overlap is determined to be less the threshold, the instance mask is determined to be invalid for that bounding box (i.e., the object is behind another transparent amorphous region or countable object). In other words, because the bounding boxes are modal, it can be assumed that the instance mask corresponds to an instance behind a transparent countable object or amorphous region when the overlap is determined to be less than a threshold. An example threshold value may be an IoU of at least about 0.7 to about 0.9 (or at least about 0.7, at least about 0.8, at least about 0.9, etc.) for the instance mask to be considered valid. This threshold may be dependent upon factors such as, without limitation, quality of the data (e.g., the more consistent/tight the bounding boxes are around the instance masks, the higher the threshold can be). While the above example utilizes modal bounding boxes, the disclosure is not so limiting and amodal bounding boxes may similarly be utilized with different or same threshold values.

At 512, the computing device may use the generated second ground truth instance mask to train the instance segmentation model (e.g., instance segmentation model 410 (c) of FIG. 4). As discussed above, training involves determining a derivative vector of a loss function for each training example, and minimizing the loss function (by minimizing the distance between the true value and the predicted value). In the current disclosure, for the training of the instance segmentation head, loss propagation is conditioned upon the overlap between the outline encompassing instance ids in panoptic mask and the corresponding modal bounding box (i.e., the mask validity computed in step 508).

Specifically, if the overlap is above the threshold (i.e., the instance mask is valid), then the region within the panoptic mask or the image is cropped out, and the instance segmentation model is trained to predict an instance mask wherever an instance id is present within that crop, and the loss function is minimized as discussed above. However, if the overlap is below the threshold (i.e., the instance mask is not valid), the instance segmentation model is still trained to predict the bounding box, but no loss is propagated for the instance mask. As discussed, it can be assumed that such a situation corresponds to an instance behind a transparent object (either a countable object or an amorphous region), and instance segmentation model can therefore, optionally, predict an additional label corresponding to whether or not the object is behind a transparent object based on the overlap between the predicted bounding box and the instance mask. In this manner, the instance segmentation model receives feedback to predict an instance mask when the object is fully visible, and never receives feedback for not predicting an instance mask when the object is behind a transparent object (even though the ground truth label has no instance mask in this case). In other words, such training of the instance segmentation model allows prediction of instance masks for the countable objects hidden behind other transparent objects (e.g., a car behind a fence) without corresponding ground truth data. This becomes possible because the instance segmentation model is trained solely based on the modal bounding box when an instance is hidden behind transparent objects by ignoring the loss calculated based on a lack of overlap between the predicted mask and the bounding box.

Optionally, modal boxes can be omitted from the ground truth labeling policy for not assigning masks to instances behind certain transparent objects such as, without limitation, passengers within a vehicle, people behind glass in a building, objects behind a fence, or the like. The instance segmentation network, in such examples, will get feedback to never predict boxes and corresponding masks for omitted instances.

At 514, the trained semantic segmentation models and instance segmentation models may receive input sensor data (e.g., an image), and provide an output including a panoptic mask corresponding to the input data. Optionally, the output may also include an indication of whether an instance is behind another object (e.g., amorphous region and/or a countable object). Moreover, as discussed above, the instance mask, the bounding box predictions, the semantic mask, and/or the panoptic mask may each be generated as outputs. The output may be in the form of the input sensor data displayed on a display device with one or more of the instance segmentation mask, semantic segmentation mask, bounding box(es), and/or panoptic segmentation mask displayed over and/or otherwise in association with the input sensor data. Subsequently, 516 is performed where method 500 ends or other operations are performed.

Aspects of the present disclosure support different training protocols. In one configuration, the system is trained end-to-end. In this configuration, the semantic segmentation model, the instance segmentation model, the bounding box model, and/or the feature extractor are trained jointly. As such, the total loss is a compound loss including all of the losses of the models, while taking into consideration the instance mask validity. In another configuration, the semantic segmentation model, the instance segmentation model and/or the bounding box model are independently trained. The training protocol may be based on a computational capacity of a device use for training the panoptic segmentation network.

Figure 6:
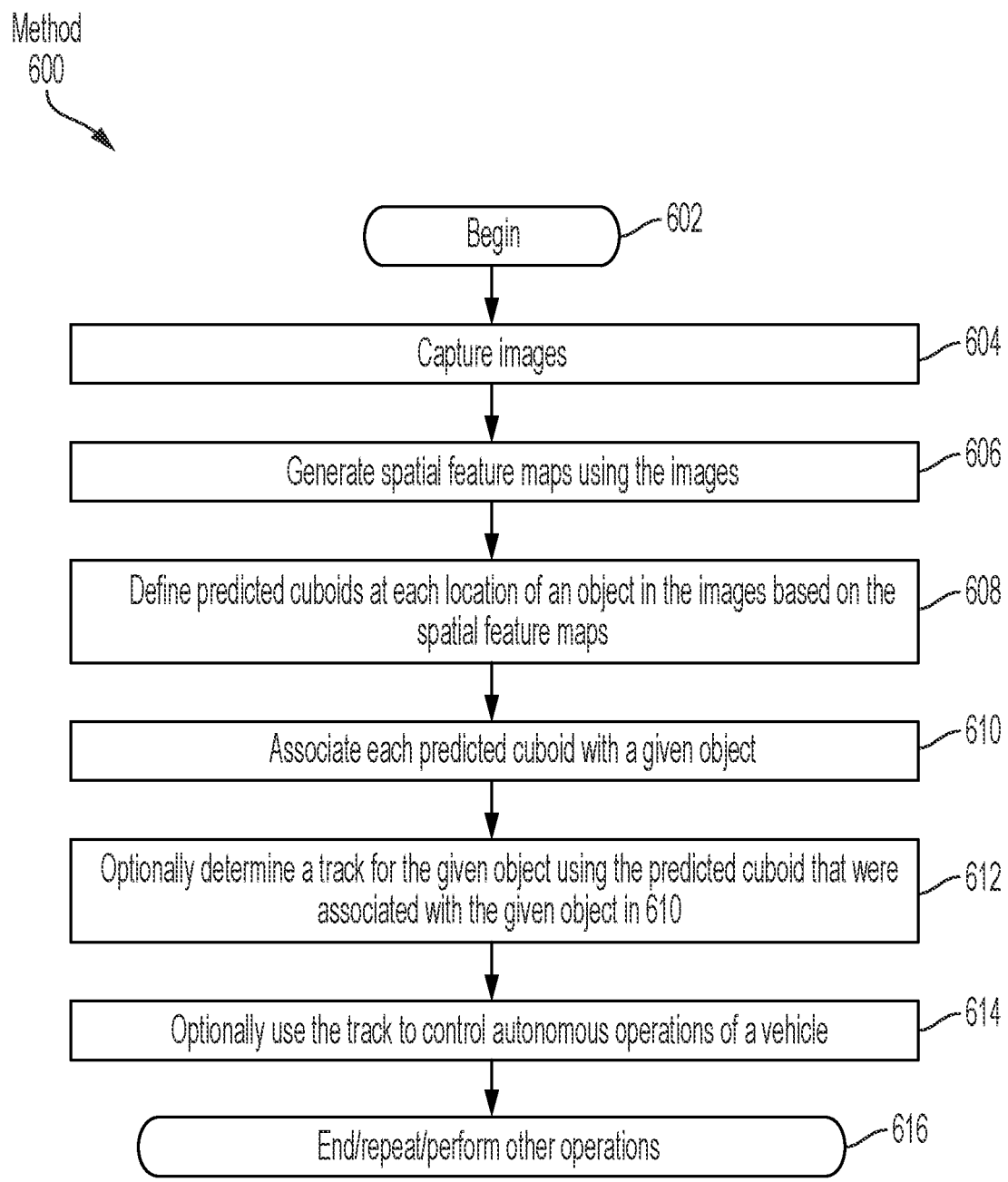
FIG. 6 provides a flow diagram that is useful for understanding an illustrative method in which a trained machine learning model and/or algorithm is employed.

Referring now to FIG. 6, there is provided a flow diagram of a method 600 for image-based perception using machine learning model(s)/algorithm(s) which was(were) trained in accordance with method 400 discussed above. In method 600, the trained machine learning model(s)/algorithm(s) (such as a CNN or RNN) is(are) used to extract features from images. The features are used to predict panoptic masks including a semantic mask, an instance mask, and 3D cuboids for amorphous region and/or countable objects in a scene. A label including an indication of whether or not an instance is behind another countable object and/or amorphous region may also be predicted.

As shown in FIG. 6, method 600 begins with 602 and continues with 604 where images are captured by a mobile platform (e.g., mobile platform 102$_1$ of FIG. 1) on which the trained machine learning model/algorithm has been deployed. The images can be captured by monocular cameras (e.g., cameras), radars, LiDARs or the like. In some example, an image comprises 3 layers (or channels) of information superimposed on each other—a Red (R) layer, a Green (G) layer and a Blue (B) layer. This image may also be referred to as an RGB image. In other examples, an image maybe a gray-scale image, an infrared image, an ultraviolet image, or any other type of image. The images can be stored in a datastore local to and/or remote from the mobile platform (e.g., datastore 112 of FIG. 1 and/or memory 312 of FIG. 3).

In 606, panoptic masks are generated by the computing device using the images captured in 604. The images can be used by the trained machine learning model/algorithm (e.g., a CNN) to generate the panoptic masks and/or the indications of whether or not an instance of an object is behind another countable object and/or amorphous region may also be predicted. For example, images are input into a trained CNN to produce output panoptic masks including indication of whether or not an instance is behind another countable object and/or amorphous region may also be predicted. The trained machine learning model/algorithm can combine outputs from the trained semantic segmentation model and the instance segmentation model to output the panoptic mask including a semantic mask, an instance mask, and 3D cuboids for amorphous regions and/or countable objects in a scene as well as the indications of whether or not an instance of an object is behind another object.

Once a panoptic mask has been generated in 610 of FIG. 6, a track for a given object (e.g., a particular instance of an object such as a vehicle, pedestrian, etc. in the panoptic mask) is optionally determined in 612. Techniques for determining object tracks are well known. The object track is then optionally used in 614 to control autonomous operations of the mobile platform. For example, the predicted cuboids are used to determine a track for the respective object. The object track can then be used to facilitate generation of a platform trajectory which the mobile platform is caused to follow. Subsequently, 616 is performed where method 600 ends or other operations are performed.

Figure 7:
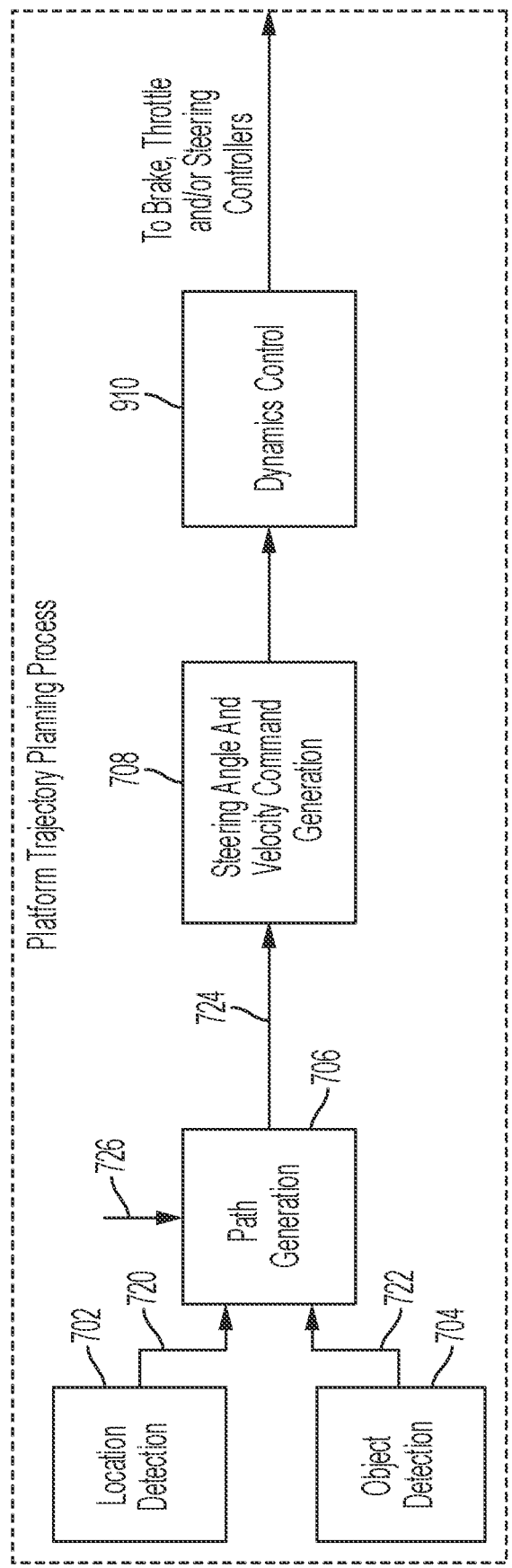
FIG. 7 provides a block diagram that is useful for understanding how a robotic system (e.g., an autonomous vehicle) is controlled in accordance with the present solution.

The predictions (e.g., cuboids) instance masks and sidewalk semantic masks generated during method 600 can be used by a mobile platform for object trajectory prediction, general scene understanding, platform trajectory generation, and/or collision avoidance. A block diagram is provided in FIG. 7 that is useful for understanding how platform control is achieved in accordance with the object related information estimated based on the modified image. All or some of the operations performed in FIG. 7 can be performed by the on-board computing device of a mobile platform (e.g., AV 102$_1$ of FIG. 1) and/or a remote computing device (e.g., computing device 110 of FIG. 1).

In block 702, a location of the mobile platform is detected. This detection can be made based on sensor data output from a location sensor (e.g., location sensor 260 of FIG. 2) of the mobile platform. This sensor data can include, but is not limited to, GPS data. Information 720 specifying the detected location of the mobile platform is then passed to block 706.

In block 704, an object is detected within proximity of the mobile platform. This detection is made based on sensor data output from a camera (e.g., camera 262 of FIG. 2) of the mobile platform and/or LiDAR datasets generated by a LiDAR system (e.g., LiDAR system 264 of FIG. 2) of the mobile platform. The manner in which the image-based perception is achieved was discussed above in relation to FIG. 6. Image-based perception information 722 about the detected object is passed to block 706. This information includes, but is not limited to, cuboid information (e.g., a position of an object, an orientation of the object, and a spatial extent of the object), an initial predicted trajectory of the object, a speed of the object, and/or a classification of the object. The initial predicted object trajectory can include, but is not limited to, a linear path pointing in the heading direction of the object.

In block 706, a platform trajectory is generated using the information from blocks 702 and 704. Techniques for determining a platform trajectory are well known in the art. Any known or to be known technique for determining a platform trajectory can be used herein without limitation. For example, in some scenarios, such a technique involves determining a trajectory for the mobile platform that would pass the object when the object is in front of the mobile platform, the object has a heading direction that is aligned with the direction in which the mobile platform is moving, and the object has a length that is greater than a threshold value. The present solution is not limited to the particulars of this scenario. The platform trajectory 724 can be determined based on the information 720, the image-based perception information 722, and/or a road map 726 which is pre-stored in a datastore of the mobile platform. The platform trajectory 724 may represent a smooth path that does not have abrupt changes that would otherwise provide passenger discomfort. For example, the platform trajectory is defined by a path of travel along a given lane of a road in which the object is not predicted travel within a given amount of time. The platform trajectory 724 is then provided to block 708.

In block 708, a steering angle and velocity command is generated based on the platform trajectory 724. The steering angle and velocity command are provided to block 710 for dynamics control.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for panoptic image segmentation, the method comprising:
    receiving an input image comprising a plurality of pixels;
    generating, from the input image, a semantic mask and an instance mask, wherein:
        the semantic mask comprises a single-channel mask that associates each pixel in the input image with a corresponding one of a plurality of labels, and
        the instance mask comprises a plurality of masks, wherein each of the plurality of masks:
            identifies an instance of a countable object in the input image, and
            is associated with an indication of whether that instance of the countable object is hidden behind another object in the input image; and
    combining the semantic mask and the instance mask to generate a panoptic mask for the input image.

2. The method of claim 1, wherein each of the plurality of labels includes a semantic indication of a type of a countable object or amorphous region for each pixel in the input image.

3. The method of claim 1, further comprising using the panoptic mask to control operations of a mobile platform.

4. The method of claim 1, wherein the instance mask further comprises a plurality of bounding boxes, each of the plurality of bounding boxes being associated with an instance of one of a plurality of countable objects in the input image, the method further comprising:
    determine the instance mask as invalid responsive to an overlap between a first bounding box and a second bounding box is less than a threshold indicative of a first countable object associated with the first bounding box is hidden behind a second countable object associated with the second countable object, wherein the second countable object is transparent.

5. The method of claim 1, further comprising:
    generating the instance mask using an instance segmentation neural network; and
    generating the semantic mask with a semantic segmentation neural network.

6. The method of claim 5, further comprising training the semantic segmentation neural network and the instance segmentation neural network using a ground truth data set comprising a collection of ground truth examples, each ground truth example comprising:
    a training image;
    a ground truth panoptic mask corresponding to the training image; and
    a plurality of instance labels, each of the plurality of instance labels comprising a modal bounding box for one of a plurality of countable objects in the training image, a class label, and pixel id associations with the ground truth panoptic mask.

7. The method of claim 6, further comprising generating a ground truth semantic mask from the ground truth panoptic mask for training the semantic segmentation neural network.

8. The method of claim 6, further comprising generating, from the ground truth panoptic mask and the plurality of instance labels, a ground truth instance mask for training the instance segmentation neural network, the ground truth instance mask comprising: a mask for each modal bounding box and an indication of mask validity for that modal bounding box.

9. The method of claim 8, wherein:
    the indication of mask validity for that modal bounding box provides information relating to whether or not that modal bounding box includes an instance of a countable object of the training image that is not hidden behind other objects in the training image; and
    the indication of mask validity is determined by computing, for each instance in the ground truth panoptic mask, an overlap between an outline encompassing that instance and a corresponding modal bounding box.

10. The method of claim 9, further comprising training the instance segmentation neural network by conditioning loss propagation during training upon the indication of mask validity such that no loss is propagated for predicting, by the instance segmentation neural network, a bounding box for an instance of a countable object that is hidden behind other objects in the training image.

11. The method of claim 9, further comprising determining that a mask is not valid when the overlap is less than a threshold.

12. A system for panoptic image segmentation, the system comprising:
    a processor; and a non-transitory computer readable medium comprising programming instructions that when executed by the processor, will cause the processor to:
receive an input image comprising a plurality of pixels;
generate, from the input image, a semantic mask and an instance mask, wherein:
the semantic mask comprises a single-channel mask that associates each pixel in the input image with a corresponding one of a plurality of labels, and
the instance mask comprises a plurality of masks, wherein each of the plurality of masks:
identifies an instance of a countable object in the input image, and
is associated with an indication of whether that instance of the countable object is hidden behind another object in the input image; and
combine the semantic mask and the instance mask to generate a panoptic mask for the input image,
wherein the instance mask further comprises a plurality of bounding boxes, each of the plurality of bounding boxes being associated with an instance of one of a plurality of countable objects in the input image, the non-transitory computer readable medium further comprising programming instructions that when executed by the processor, will cause the processor to:
determine the instance mask as invalid responsive to an overlap between a first bounding box and a second bounding box is less than a threshold indicative of a first countable object associated with the first bounding box is hidden behind a transparent amorphous region.

13. The system of claim 12, further comprising programming instructions that when executed by the processor, will cause the processor to use the panoptic mask to control operations of a mobile platform.

14. The system of claim 12, further comprising programming instructions that when executed by the processor, will cause the processor to:
generate the instance mask using an instance segmentation neural network; and
generate the semantic mask with a semantic segmentation neural network.

15. The system of claim 14, further comprising programming instructions that when executed by the processor, will cause the processor to train the semantic segmentation neural network and the instance segmentation neural network using a ground truth data set comprising a collection of ground truth examples, each ground truth example comprising:
a training image;
a ground truth panoptic mask corresponding to the training image; and
a plurality of instance labels, each of the plurality of instance labels comprising a modal bounding box for one of a plurality of countable objects in the training image, a class label, and pixel id associations with the ground truth panoptic mask.

16. The system of claim 15, further comprising programming instructions that when executed by the processor, will cause the processor to generate a ground truth semantic mask from the ground truth panoptic mask for training the semantic segmentation neural network.

17. The system of claim 15, further comprising programming instructions that when executed by the processor, will cause the processor to generate, from the ground truth panoptic mask and the plurality of instance labels, a ground truth instance mask for training the instance segmentation neural network, the ground truth instance mask comprising: a mask for each modal bounding box and an indication of mask validity for that modal bounding box.

18. The system of claim 17, wherein:
the indication of mask validity for that modal bounding box provides information relating to whether or not that modal bounding box includes an instance of a countable object of the training image that is not hidden behind other objects in the training image; and
the indication of mask validity is determined by computing, for each instance in the ground truth panoptic mask, an overlap between an outline encompassing that instance and a corresponding modal bounding box.

19. The system of claim 18, further comprising programming instructions that when executed by the processor, will cause the processor to train the instance segmentation neural network by conditioning loss propagation during training upon the indication of mask validity such that no loss is propagated for predicting, by the instance segmentation neural network, a bounding box for an instance of a countable object that is hidden behind other objects in the training image.

20. A computer program product comprising a memory and programming instructions that are configured to cause a processor to:
receive an input image comprising a plurality of pixels;
generate, from the input image, a semantic mask and an instance mask, wherein:
the semantic mask comprises a single-channel mask that associates each pixel in the input image with a corresponding one of a plurality of labels, and
the instance mask comprises a plurality of masks, wherein each of the plurality of masks:
identifies an instance of a countable object in the input image, and
is associated with an indication of whether that instance of the countable object is hidden behind another object in the input image; and
combine the semantic mask and the instance mask to generate a panoptic mask for the input image.

* * * * *